March 13, 1962   R. H. HUDDLESTON, JR   3,024,658
MEASURING SYSTEM
Filed March 9, 1959   2 Sheets-Sheet 1
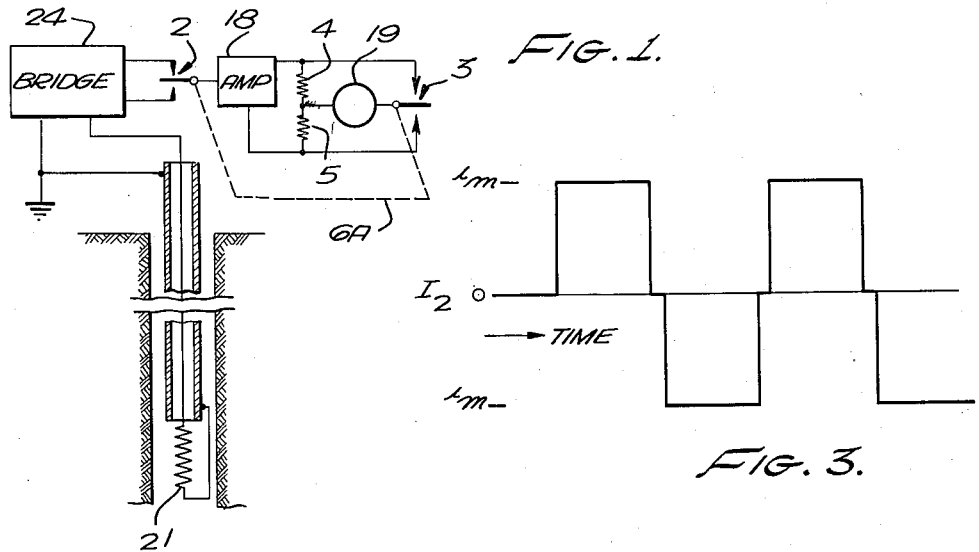
FIG. 1.
FIG. 3.
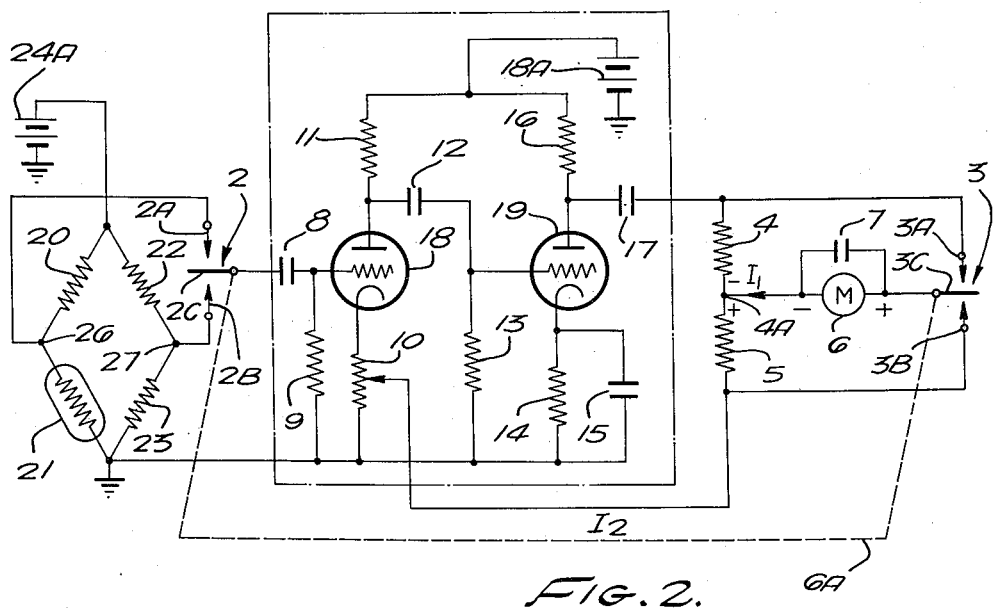
FIG. 2.
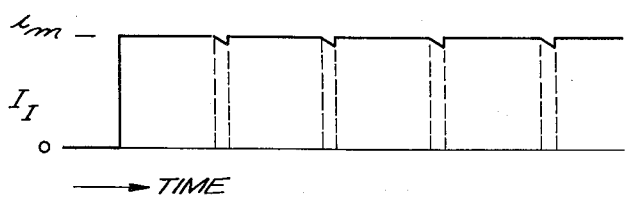
FIG. 4.
RICHARD H. HUDDLESTON, JR.
INVENTOR.
BY Lyon & Lyon
ATTORNEYS

RICHARD H. HUDDLESTON, JR.
INVENTOR.

BY Lyon & Lyon

ATTORNEYS 3,024,658
Patented Mar. 13, 1962

3,024,658
MEASURING SYSTEM
Richard H. Huddleston, Jr., Houston, Tex., assignor to Halliburton Company, a corporation of Delaware
Filed Mar. 9, 1959, Ser. No. 798,204
9 Claims. (Cl. 73—362)

The present invention relates to improved means and techniques for indicating or recording unidirectional signals and is particularly useful in, for example, indicating or recording the unbalanced voltage in a bridge circuit, one arm of which comprises a thermistor located in a well bore for indicating or measuring well temperatures.

The arrangement described herein consists essentially of a volt meter having both an indicating meter and a recording galvanometer in the output of an amplifier to measure the unbalance of a resistance bridge energized by direct current. One arm of the bridge is a thermistor which provides a measurement of temperature. The present invention is particularly useful when, as shown herein, the unbalanced voltage of the bridge appears across two terminals, both of which are at different potentials with respect to ground. The arrangement is such that the bridge is not kept balanced but the output voltage of the brideg serves as an indication of temperature. It is necessary, therefore, that the measuring system have both a stable zero as well as a stable sensitivity.

Briefly, the arrangement serves to convert the unidirectional unbalanced voltage (of either positive or negative polarity as determined by the condition of the bridge) into a bidirectional signal which is then conveniently amplified in an A.C. type amplifier which incorporates a degenerative current feedback connection extending from the output of the amplifying means to the input circuit without, however, interfering with the input signal. An indicating meter or recording galvanometer of the unidirectional type is alternatively connected to different points in the output circuit and in timed relationship with the bidirectional signal. While the arrangement described herein is particularly useful in producing indications of voltages existing across a pair of terminals, neither one of which is at ground potential, the present invention, as disclosed herein, is applicable also to the indication of voltages when one of such terminals is grounded.

It is, therefore, an object of the present invention to provide improved means and techniques whereby the above indicated results are accomplished.

Another object of the present invention is to provide an arrangement wherein relatively small unidirectional voltages which are susceptible of polarity change may be indicated at a remote location as, for example, on the surface above a well bore.

Another object of the present invention is to provide an improved polarity-sensitive, direct current voltage measuring system which has stable characteristics, relative to both calibration sensitivity and freedom from noise and drift.

Another object of the present invention is to provide a system of this character wherein a polarity-sensing device is in a current feedback loop and provides full wave detection together with stabilized gain and freedom from spurious responses.

Another object of the present invention is to provide a polarity-sensitive system of this character for both differential type input signals as well as for single-ended type input signals.

Another object of the present invention is to provide a system of this character in which a polarity-sensing element in the form of a phase detector is in a current feedback loop, and the feedback signal in such loop is isolated from the input signals.

Another object of the present invention is to provide a system as indicated in the preceding paragraph in which the feedback signal is of the bidirectional or alternating current type rather than a unidirectional or D.C. signal so that the action is instantaneous and not subject to delay as would otherwise be the case when a rectified (D.C.) type feedback signal is used.

Another object of the present invention is to provide a system of this character having high stability against spurious oscillations, either of the low or high frequency type, this result being accomplished due to isolation between the input and feedback signals and further to the instantaneous action of the feedback.

A specific object of the present invention is to provide a system of this character featured by the fact that a feedback path which includes the indicating meter or galvanometer extends from the output of the amplifying means to the input circuit without, however, interfering with the input signal.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates the use of the present invention in well temperature logging.

FIGURE 2 is a schematic representation of the apparatus used in FIGURE 1.

FIGURE 3 illustrates the form of the signal in the output of the amplifying means shown in FIGURE 2.

FIGURE 4 illustrates the form of the current flowing through the indicating means in FIGURE 2 with and without filtering.

Figure 5:
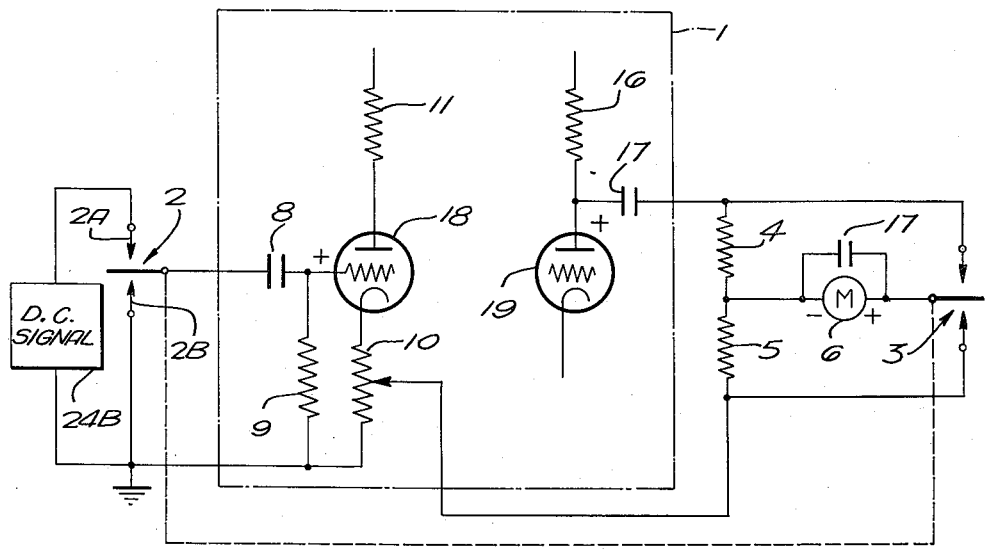
FIGURE 5 illustrates a modified form of the invention for indicating single-ended signals instead of differential type signals as in FIGURE 2.

As shown in FIGURE 1, the invention is particularly useful in measuring or indicating the temperature in well bores. The thermistor 21 which forms one arm of a resistance bridge 24 is disposed in a well logging tool which is lowered into the well bore and one terminal of the thermistor is grounded to the cable sheath. The other components of the bridge 24, amplifying means 18 and indicating means 19, may be located on a surface above the well bore, as indicated in FIGURE 1.

The other three arms of the bridge 24 comprise resistances 20, 22 and 23. The bridge is energized by the D.C. source 24A which has one of its terminals grounded. The unbalanced bridge voltage appears across the pair of terminals 26 and 27. This unbalanced bridge voltage may in some cases undergo changes in polarity and, indeed, become zero depending upon the value of the resistance of the thermistor 21, i.e. upon the temperature being measured in the well bore.

No effort is made to maintain the bridge 24 in a balanced condition, thus the output measuring system is of the deflection instead of null type. The bridge terminals 26 and 27 are connected to corresponding terminals of a switching means 2 which may take many different forms such as an electromagnetic chopper, a commutator or the like. For purposes of simplicity, the switching means 2 is illustrated in the form of a single-pole double throw switch in which the fixed terminals 2A, 2B of the switch are connected to corresponding bridge terminals 26, 27. The movable switch arm 2C is connected through coupling condenser 8 to the control grid of the first amplifying stage 18 of a two-stage amplifier. This grid is returned to ground through resistance 9. The cathode of the same tube is returned to ground through a potentiometer-type resistance 10. The anode of tube 18 is connected to the positive ungrounded terminal of source 18A through the load resistance 11, and such anode is coupled to the control grid of tube 19 through the coupling condenser 12. The latter control grid is returned to ground through resistance 13. The cathode of tube 19 is returned to ground through the biasing resistance 14 which is shunted by condenser 15. The anode of tube 19 is connected to the positive terminal of source 18A through load resistance 16 and is also coupled through condenser 17 to the impedance means 4, 5 in the form of a pair of equal value resistances 4 and 5. These resistances 4, 5 are connected at a common junction point 4A and one terminal of resistance 5 is connected to the movable tap on potentiometer resistance 10 to provide a degenerative current feedback path in which current $I_2$ in the form illustrated in FIGURE 3 flows.

Indicating means 6 in the form of a milliampere meter, recording galvanometer and the like is alternately shunted across the resistances 4 and 5, using switching means 3 which may be in the form described in connection with the other switching means 2; and it is understood that these two switching means 2, 3 are operated together in synchronism as indicated by the dotted line 6A extending between the movable arms 2C, 3C of the single-pole double throw switches 2, 3.

For these purposes one terminal of the indicating means 6 is connected to the junction point 4A and the other terminal of the indicating means 6 is connected to the movable switch arm 3C. The two stationary switch contacts 3A, 3B are connected respectively to different terminals of resistances 4, 5. The form of the current $I_1$ flowing through the indicating means 6 is indicated by the solid line in FIGURE 4 when filtered using, for example, a condenser 7 connected in shunt with the indicating means 6. Other forms of filters, if desired, may be used for this purpose. If the filter is omitted, the current $I_1$ is as shown except modified by the dashed lines.

The arrangement shown in FIGURE 2 is readily adapted to operate in conjunction with single-ended signals, i.e. signals developed across a pair of terminals one of which is grounded. Such arrangements are disclosed in FIGURES 5 and 6 wherein corresponding elements have identical reference numerals. In FIGURE 5, the switch contact 2B is grounded and the single-ended signal from source 24B is applied to contact 2A.

Figure 6:
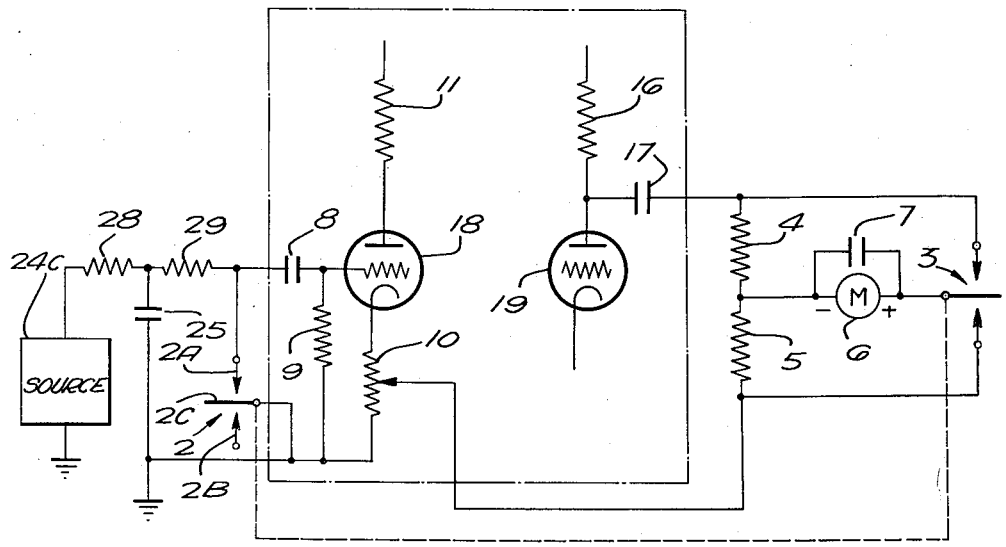
FIGURE 6 illustrates another modified form of the invention also suitable for the indication of single-ended signals.

In FIGURE 6 the input signal is applied from source 24C, such source being connected through resistances 28, 29 and coupling condenser 8 to the control grid of tube 18. The junction point of the resistances 28, 29 is bypassed to ground through condenser 25. The junction point of resistance 29 and condenser 8 is connected to the stationary switch contact 2A, the other stationary switch contact 2B being unconnected and the movable arm 2C of the switch 2 is in this case grounded. From this it will be seen that the switch arm 2C serves to short out the incoming signal when the arm engages the contact 2A and that there is applied to the control grid of tube 18 a signal essentially of zero potential with repect to ground. The resistances 28, 29 and condenser 25 thus alleviate transients and other disturbances of source 24C when the short-circuiting action occurs.

In operation of the arrangement shown in FIGURE 2, an unbalanced voltage is developed across the bridge terminals 26, 27 and such voltage has a value depending upon the resistance of thermistor 21, i.e. upon the temperature of the well bore. This signal or voltage is applied to switch contacts 2A, 2B and is a differential-type D.C. signal, relative to ground. By means of the switch arm 2C, the points or contacts 2A, 2B are alternately connected to one end of capacitor 8, thus causing an A.C.-type signal to appear at the junction of condenser 8 and resistance 9, the frequency of which is determined by the switching rate of the arm 2C or chopper and this rate may, for example be sixty times per second.

Preferably condenser 8 and resistance 9 have values such that their time constant is long compared to the period of the frequency of the chopper. Thus, the A.C. signal appearing on the grid of tube 18 will be a symmetrical square wave.

The output from the amplifier 19 is taken from the anode and is coupled to the detector by means of condenser 17, which is part of the series feedback circuit. The switch arm 3C which is driven at the same frequency as the switch arm 2C and in synchronism therewith alternately shunts the indicating means 6 across resistance 4 and resistance 5.

The series feedback circuit is completed by being connected to the adjustable contact arm of resistance 10 to provide negative current feedback to the input stage of amplifier 18 to stabilize the output current. The current in the feedback loop, indicated as $I_2$, is a faithful replica of the input signal on the grid of tube 18 and is shown in FIGURE 3. When the switch arms 2C and 3C are properly phased as intended, a unidirectional current flows through the indicating means as indicated by the solid line in FIGURE 4.

FIGURE 4 indicates the wave form of the current, $I_1$, through the meter 6 if the condenser is connected as shown in FIGURE 2. It is apparent that the filtering problem is small in that the only discontinuity present is due to the short transition time of the contacts of the switch, and the same may be readily reduced to negligible proportions by condenser 7 without appreciably reducing response time.

Preferably, the resistors 4 and 5 should be as small as possible to minimize variations in impedance in the feedback loop; however, in the interests of efficiency, resistors 4 and 5 should be as large as possible. For example, when resistors 4 and 5 are equal to the resistance of meter 6, an efficiency of 50% results. In practice, excellent performance has been obtained when resistances 4 and 5 are about ten times as large as the resistance of meter 6, in which case the efficiency is about 90%.

It is noted that the output is not sensitive to leakage resistance of condenser 17. When a D.C. current flows through resistors 4 and 5 from the anode of triode 19, as the result of leakage resistance of condenser 17, the equal voltage drops thus produced across resistances 4 and 5 are alternately connected across meter 6, but of opposite polarity. Thus, the average current flow through meter 6 due to this source is zero, eliminating any zero offset error.

Although only one meter 6 is shown in the measuring circuit, a recording galvanometer may, for example, be placed in series with it (both shunted by condenser 7) or may be placed in that position with the meter 6 omitted.

It is thus seen that the system described herein may be used in the measurement of D.C. voltages which are either single-ended or of the differential type with respect to ground, and provides polarity sensing together with stabilized sensitivity or gain, and the same has an inherent zero drift characteristic and is free from instabilities resulting from spurious oscillations and damping problems. Bandwidth is determined by the driving frequency of the choppers 2 and 3.

It has been found that a two-stage amplifier has sufficient gain for the present purposes and, as shown, it is of the non-inverting type to provide the proper phase relation for the feedback. The amplifier is an A.C. amplifier to eliminate D.C. drift problems, thus contributing to stability. This amplifier presents a high output impedance due to the current feedback provided by the feedback loop.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system for producing an indication of a voltage, a first and a second terminal between which said voltage is applied, amplifying means, said amplifying means having a pair of input electrodes and an output electrode and incorporating means for producing a voltage change at said output electrode in response to a change in voltage between said input terminals, first switching means alternately coupling one of said input electrodes to each of said terminals in sequence, a feedback path having different portions thereof extending in a series circuit from said output electrode to the other of said input electrodes, indicating means, second switching means alternately connecting said indicating means in shunt with said different portions of said feedback path, and means operating said first and second switching means in synchronism.

2. A system as set forth in claim 1 in which said first and second input terminals each have a voltage applied thereto with respect to a reference potential.

3. A system as set forth in claim 1 in which one of said first and second terminals is at a reference potential.

4. A system as set forth in claim 1 in which said voltage comprises a source having one of its terminals at a reference potential and said first switching means comprises a switch having a movable contact and a fixed contact, and means coupling the stationary contact of said switch to the other terminal of said source and the movable contact of said source being at a reference potential.

5. A system as set forth in claim 1 in which said first and second terminals comprise the output terminals of a bridge circuit.

6. A system as set forth in claim 5 in which one arm of said bridge circuit comprises a thermistor.

7. A system as set forth in claim 6 in which the thermistor comprises an element of a well logging tool for sensing temperature in a well bore.

8. A system as set forth in claim 1 in which said feedback connection comprises a degenerative feedback connection.

9. A system as set forth in claim 1 in which said amplifying means comprises an amplifier having a single-ended input circuit and a single-ended output circuit.

References Cited in the file of this patent

UNITED STATES PATENTS

| | | |
|---|---|---|
| 2,133,670 | Schuchmann | Oct. 18, 1938 |
| 2,261,335 | Broden | Nov. 4, 1941 |
| 2,459,730 | Williams | Jan. 18, 1949 |
| 2,497,129 | Liston | Feb. 14, 1950 |
| 2,508,082 | Wald | May 16, 1950 |
| 2,590,477 | Weber et al. | Mar. 25, 1952 |
| 2,659,863 | Stanton | Nov. 17, 1953 |
| 2,688,729 | Offner | Sept. 7, 1954 |
| 2,709,753 | Krasnow et al. | May 31, 1955 |
| 2,858,511 | Chauvin et al. | Oct. 28, 1958 |
| 2,906,830 | Hanford | Sept. 29, 1959 |
| 2,931,985 | Offner | Apr. 5, 1960 |
| 2,942,188 | Mitchell | June 21, 1960 |